US008483440B2

United States Patent
Fan et al.

(10) Patent No.: US 8,483,440 B2
(45) Date of Patent: Jul. 9, 2013

(54) METHODS AND SYSTEMS FOR VERIFYING AUTOMATIC LICENSE PLATE RECOGNITION RESULTS

(75) Inventors: Zhigang Fan, Webster, NY (US); Vladimir Kozitsky, Rochester, NY (US); Aaron Michael Burry, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 286 days.

(21) Appl. No.: 13/086,152

(22) Filed: Apr. 13, 2011

(65) Prior Publication Data

US 2012/0263352 A1    Oct. 18, 2012

(51) Int. Cl.
*G06K 9/00* (2006.01)
*G08G 1/97* (2006.01)

(52) U.S. Cl.
USPC .......................... 382/105; 382/209; 340/931

(58) Field of Classification Search
USPC ................ 382/100, 103–107, 155, 162, 168, 382/173, 181, 189, 194, 199, 209, 224, 232, 382/254, 274, 276, 286–292, 305, 312; 340/425.5, 539.11, 931; 235/384
See application file for complete search history.

(56) References Cited

U.S. PATENT DOCUMENTS

| | | | | |
|---|---|---|---|---|
| 4,817,166 A | * | 3/1989 | Gonzalez et al. | 382/105 |
| 6,473,517 B1 | * | 10/2002 | Tyan et al. | 382/105 |
| 2002/0080013 A1 | * | 6/2002 | Anderson et al. | 340/425.5 |
| 2003/0132295 A1 | * | 7/2003 | Messina | 235/384 |
| 2009/0267757 A1 | * | 10/2009 | Nguyen | 340/539.11 |
| 2012/0106781 A1 | * | 5/2012 | Kozitsky et al. | 382/103 |

OTHER PUBLICATIONS

U.S. Appl. No. 12/916,749, filed Nov. 1, 2010, Kozitsky et al.
Anagnostopoulos, C.-N. E. et al., "License Plate Recognition From Still Images and Video Sequences: A Survey," *IEEE Transactions on Intelligent Transportation Systems* (2008) 9(3):377-391.

* cited by examiner

*Primary Examiner* — Seyed Azarian
(74) *Attorney, Agent, or Firm* — Luis M. Ortiz; Kermit O. Lopez; Ortiz & Lopez, PLLC (57) ABSTRACT

Methods and systems for verifying automatic license plate recognition results providing an input image of a license plate to a processing system that extracts bitmap data from the provided input image and determines a particular license template image associated with the license plate input image. The processing system segments the input image bitmap data into text region bitmap data and outer region bitmap data and then matches the input image text region bitmap data and input image outer region bitmap data against text region bitmap data and outer region bitmap data, respectively, of the license plate image template to determine if there is a match between the license plate of the input image and the template license plate.

17 Claims, 7 Drawing Sheets

METHODS AND SYSTEMS FOR VERIFYING AUTOMATIC LICENSE PLATE RECOGNITION RESULTS

TECHNICAL FIELD

Embodiments are generally related to data-processing systems and methods. Embodiments also relate in general to the field of computers and similar technologies and, in particular, to software utilized in this field. In addition, embodiments relate to methods and systems for verifying automatic license plate recognition results.

BACKGROUND OF THE INVENTION

Automatic license plate recognition (ALPR) often functions as a core module for an intelligent transportation infrastructure system. An example of ALPR technology is disclosed in C.-N. E. Anagnostopoulos, et al, "License Plate Recognition From Still Images and Video Sequences: A Survey", IEEE Trans. On Intelligent Transportation Systems, vol 9 (3), September 2008, pp 377-391, the contents of which is incorporated by reference herein. As many ALPR applications demand high accuracy, verification methods have been introduced to reduce recognition error rates.

There is a need to provide improved methods and systems for verifying license plate information of vehicles and other systems.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

According to one aspect, there is provided a method for verifying automatic license plate recognition results. The method can comprise: providing an input image of a license plate to a processing system; determining, in said processing system, a particular license template image associated with said license plate input image; said license template image having a text region and outer region; extracting, in said processing system, bitmap data from said provided input image; segmenting, in said processing system, said bitmap data into bitmap data text region and bitmap data outer region; matching, in said processing system, said text region bitmap data against a bitmap text region of said license plate image template; and matching, in said processing system, said outer region bitmap data against a bitmap outer region of said template.

According to another aspect, there is provided a system for verifying automatic license plate recognition results. The system can comprise a processor; a data bus coupled to said processor; and a computer usable medium embodying computer program code, said computer usable medium being coupled to said data bus; and said computer program code comprising instructions executable by said processor and configured to: provide an input image of a license plate to a processing system; determine a particular license template image associated with said license plate input image; said license template image having a text region and outer region; extract bitmap data from said provided input image; segment said bitmap data into bitmap data text region and bitmap data outer region; match said text region bitmap data against a bitmap text region of said license plate image template; and match said outer region bitmap data against a bitmap outer region of said template.

According to yet another aspect, there is provided a computer-usable medium for verifying automatic license plate recognition results, said computer-usable medium embodying computer program code, said computer program code comprising computer executable instructions configured for: providing an input image of a license plate to a processing system; determining, in said processing system, a particular license template image associated with said license plate input image; said license template image having a text region and outer region; extracting bitmap data from said provided input image; segmenting said bitmap data into bitmap data text region and bitmap data outer region; and matching said text region bitmap said outer region bitmap data against a bitmap outer region of said template.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

In automatic license plate recognition techniques, a "signature", which is a feature set extracted from the plate, is stored as a template into a database together with the OCR result when a plate is believed to be accurately recognized. For a newly detected plate that needs verification, its OCR result is used as an index to compare its signature to the templates in the database, The OCR is verified if the matching is positive. The method is particularly attractive for certain operational workflows, for instance, those in which a plate is always human verified when it is first detected by the system, There are other utilities for the plate matching technology. For example, plate matching technology can be applied in identifying a vehicle from a set of candidates. See for example the disclosure of V. Kozitsky, A. Burry, Z. Fan, F. Mayberry, J. Deppe, "System For License Plate Signature Based Order Tracking", disclosed in U.S. patent application Ser. No. 12/916,749, the contents of which is incorporated herein by reference.

Technical features described in this application can be used to construct various embodiments of methods and systems for verifying automatic license plate recognition. As a general overview, bitmap data of the input image plate is extracted and segmented in bitmap data representing the text region of the input image plate and the bitmap data representing the outer region of the input image plate. The text region bitmap data can then be matched against template text region information and the surrounding bitmap data can be matched against template outer region information. If necessary, the results of this matching can be weighted and/or combined to evaluate the matches.

The following discussion is intended to provide a brief, general description of suitable computing environments in which the method and system may be implemented. Although not required, the method and system will be described in the general context of computer-executable instructions such as program modules being executed by a single computer. Generally, program modules include routines, programs, objects, components, data structures, etc., that perform particular tasks or implement particular abstract data types. Moreover, those skilled in the art will appreciate that the method may be practiced with other computer system configurations including hand-held devices, multi-processor systems, microprocessor-based or programmable consumer electronics, networked PCs, minicomputers, mainframe computers, and the like.

Figure 1:
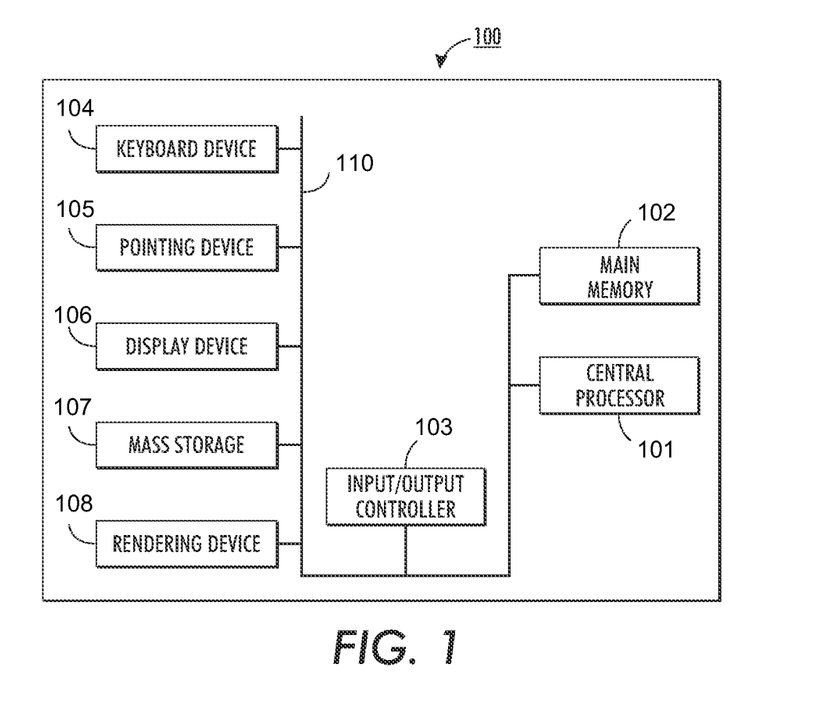
FIG. 1 illustrates a schematic view of a computer system in which the present invention may be embodied.

As depicted in FIG. 1, the present invention may be embodied in the context of a data-processing apparatus 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a rendering device 108, may be included in the data-processing apparatus 100 as desired. As illustrated, the various components of the data-processing apparatus 100 communicate through a system bus 110 or similar architecture. It can be appreciated that the data-processing apparatus 100 may be in some embodiments a mobile computing device such as a Smartphone, a laptop computer, iPhone, etc. In other embodiments, data-processing apparatus 100 may function as a desktop computer, server, and the like, depending upon design considerations.

Figure 2:
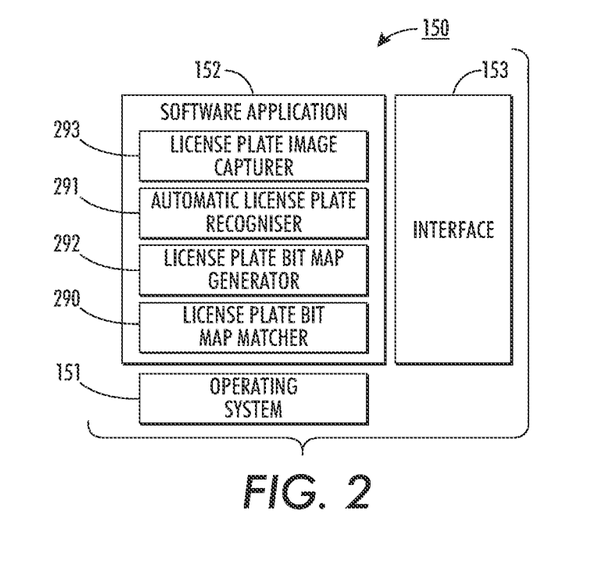
FIG. 2 illustrates a schematic view of a software system including an operating system, application software, and a user interface for carrying out the present invention.

FIG. 2 illustrates a computer software system 150 for directing the operation of the data-processing apparatus 100 depicted in FIG. 1. Software system 150, which is stored in system memory 102 and on disk memory 107, can include a kernel or operating system 151 and a shell or interface 153. One or more application programs, such as application software 152, may be "loaded" (i.e., transferred from storage 107 into memory 102) for execution by the data-processing apparatus 100. The data-processing apparatus 100 receives user commands and data through user interface 153; these inputs may then be acted upon by the data-processing apparatus 100 in accordance with instructions from operating module 151 and/or application module 152.

Note that the term "module" as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term "module" may also simply refer to an application such as a computer program design to assist in the performance of a specific task such as word processing, accounting, inventory management, etc.

The interface 153, which is preferably a graphical user interface (GUI), also serves to display results, whereupon the user may supply additional inputs or, for example, terminate a given session. In one embodiment, operating system 151 and interface 153 can be implemented in the context of a "Windows" system. It can be appreciated, of course, that other types of systems are possible. For example, rather than a traditional "Windows" system, other operating systems such as, for example, Linux may be employed with respect to operating system 151 and interface 153 in another embodiment. Application module 152, on the other hand, can include instructions such as the various operations described herein (see for example, the methods depicted in FIGS. 5 to 7 of the accompanying drawings.) More specifically, in one example, the software application 152 can include modules 290-292. As will be explained in more detail below, module 291 is adapted for automatically recognizing a license plate of a vehicle based on an input image. Module 292 is adapted for generating bitmaps from the input image. Module 290 is adapted for matching the generated the bitmaps. Software application 152 can include a license plate image capturer 293, if necessary.

Figure 3:
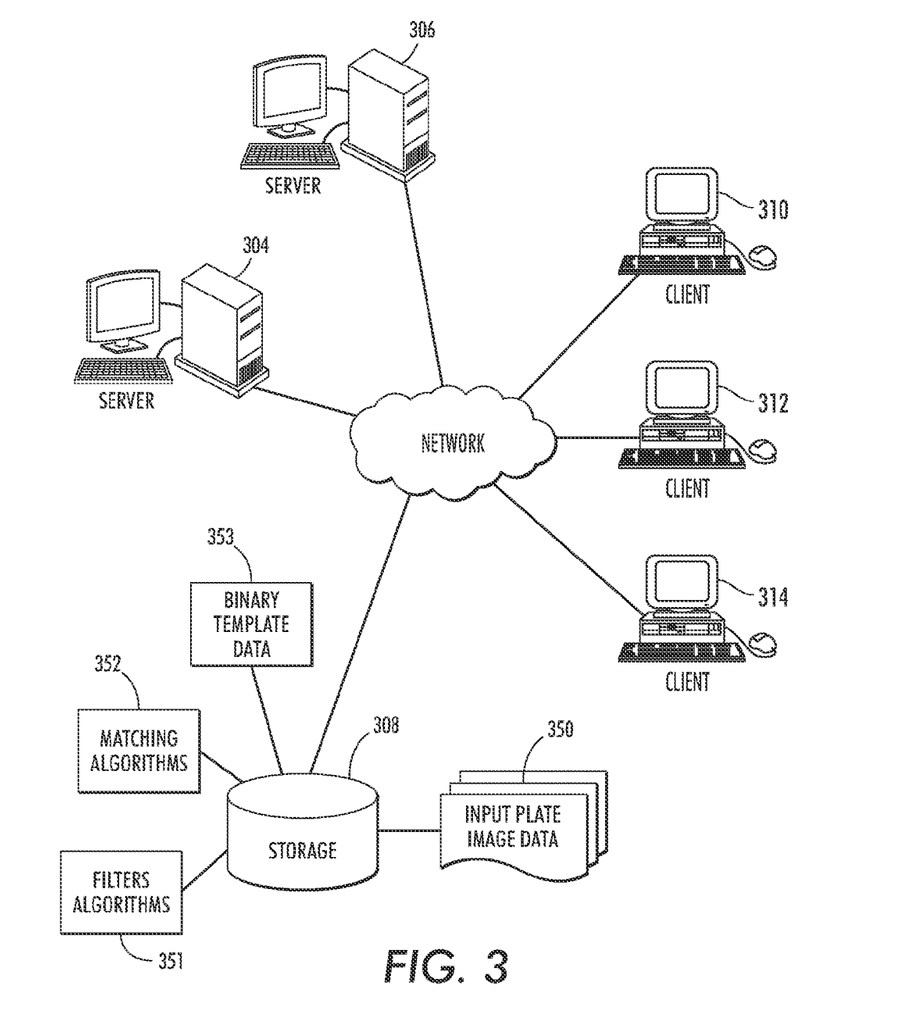
FIG. 3 illustrates a graphical representation of a network of data processing systems in which aspects of the present invention may be implemented.

FIG. 3 illustrates a graphical representation of a network of data processing systems in which aspects of the present invention may be implemented. Network data processing system 300 is a network of computers in which embodiments of the present invention may be implemented. Network data processing system 300 contains a network, which is the medium used to provide communication links between various devices and computers connected together within network data processing system 100. The network may include connections such as wire, wireless communication links, or fiber optic cables.

In the depicted example, servers 304 and 306 connect to the network along with storage unit 308. In addition, clients 310, 312, and 314 connect to the network. These clients 310, 312, and 314 may be, for example, personal computers or network computers. Data-processing system 100 depicted in FIG. 1 can be, for example, a client such as client 310, 312, and/or 314. Alternatively, data-processing system 100 can be implemented as a server such as servers 304 and/or 306, depending upon design considerations. In the depicted example, server 304 provides data such as boot files, operating system images, and applications to clients 310, 312, and 314. Clients 310, 312, and 314 are clients to server 304 in this example. Network data processing system 300 may include additional servers, clients, and other devices not shown. Specifically, clients may connect to any member of a network of servers which provide equivalent content. It should be appreciated that the computational tasks described herein may be carried out on multiple servers that communicate theft data and results over a network. It should also be appreciated that the clients 310, 312, and/or 314 may provide an interface to the user for collecting input and presenting results and can additionally communicate tasks to the servers 304 and/or 306 over the network.

Input image data 350 for one or more license plates is stored in a database 308 that can be accessed by the end-user work stations 310, 312, and 314 and servers 304, 306. The input image data 350 can be stored in an electronic form in the database 308 and can include graphic or other information image data. The input image data can be derived from a license plate image capturing camera or other image capturing device for capturing images of license plates of vehicles. The input image data can be pre-stored in a suitable format. Alternatively, input plate image data can be obtained directly from the license plate image capturing device. The input image data may also be distributed over multiple storage locations and is accessible via a network (e.g., web pages accessible via the Internet and World Wide Web). Furthermore, binary template data 353 can be stored in database 350. Filtering algorithms 351 for use in generating image bitmaps and matching algorithms 352 for use in matching up image bitmap data may, if necessary, be stored in the database.

In the depicted example, network data processing system 300 is the Internet with a network representing a worldwide collection of networks and gateways that use the Transmission Control Protocol/Internet Protocol (TCP/IP) suite of protocols to communicate with one another. At the heart of the Internet is a backbone of high-speed data communication lines between major nodes, or host computers, consisting of thousands of commercial, government, educational, and other computer systems that route data and messages. Of course, network data processing system 300 may also be implemented as a number of different types of networks such as, for example, an intranet, a local area network (LAN), or a wide area network (WAN). FIG. 1 is intended as an example and not as an architectural limitation for different embodiments of the present invention.

FIGS. 1-3 are provided as exemplary diagrams of data processing environments and systems in which embodiments of the present invention may be implemented. It should be appreciated that FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention. Note that in FIGS. 1-10, identical or similar parts are generally indicated by identical reference numerals.

The following description is presented with respect to embodiments of the present invention, which can be embodied in the context of a data-processing system such as data-processing system 100 and computer software system 150 depicted respectively in FIGS. 1-2. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Macintosh, UNIX, LINUX, and the like. Therefore, the description of the exemplary embodiments, which follows, is for purposes of illustration and not considered a limitation.

Figure 4:
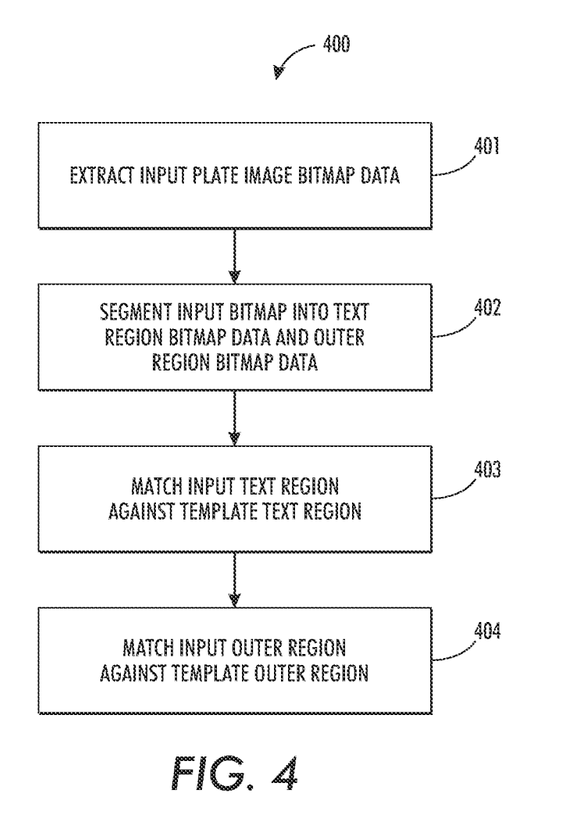
FIG. 4 illustrates a flow chart of a method for verifying automatic license plate recognition results according to one embodiment.

A method 400 for verifying automatic license plate recognition results according to one embodiment will now be described. FIG. 4 is an outline of the processes of method 400. Initially, bitmap data is extracted from an input image of a license plate (401). The extracted input image bitmap data is segmented into bitmap data representing the text region of the input license plate image and bitmap data representing the outer region of the input license plate image (402). The bitmap data representing the text region of the input image is then matched against bitmap data of a text region of a template form (403). The bitmap data representing the outer region of the input image is then matched against bitmap data of an outer region of the template form (404). Method 400 is not limited to the particular sequence of processes shown in FIG. 4. For example, process 403 may be performed subsequent to, or substantially concurrently with, process 404.

Figure 7A:
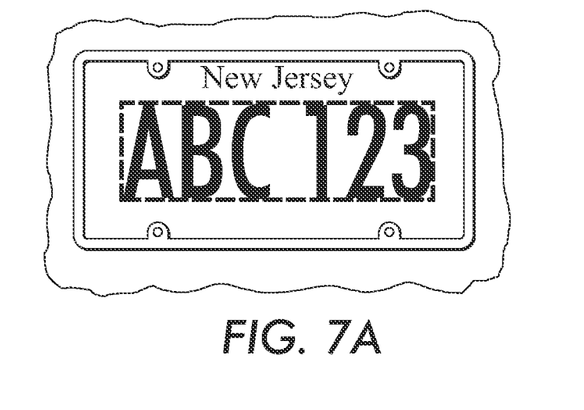
FIGS. 7A-7C illustrate exemplary vehicle license plate images to be verified.
Figure 7B:
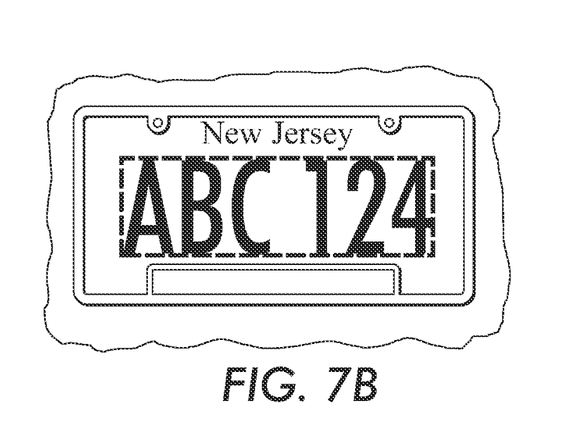
Figure 7C:
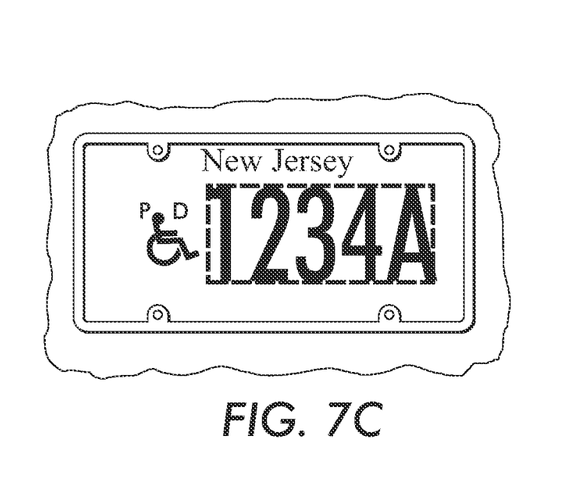

Method 400 is based on the following observations: a vehicle license plate image can often be decomposed into two parts: a text region and an outer region. The former contains the text string to be recognized by the ALPR and the latter covers the rest of the plate, and possibly a small portion outside of the plate area. The regions are shown in FIGS. 7A-7C for three exemplar plates (the text regions are the ones inside the dotted line rectangles and the surrounding regions are the ones outside). The text regions feature thin character strokes with sharp edges, which contain significant amount of high frequency energy. The matching errors in the region are mainly originated from registration inaccuracy and background variation caused by different illumination and shadowing. The surrounding regions are arguably low frequency in nature. The objects in the regions can be divided into three types. One is the relatively large (compared to the character stroke width) slowly varying objects, for example, stickers and picture logos. The other is the small text such as state names and the text on the plate frames. As the small text is often blurred and barely recognizable in the image, matching them for their shape usually does not produce usable results. They are better to be further blurred to perform coarse match. The third type of object is text-looking logos, for example, the handicap logo in the third plate in FIG. 7C.

Although an accurate shape matching is possible, its benefit is limited. Unlike the text, the logo is not likely to be compared to a different but similarly looking object; a coarse matching is usually proven to be accurate enough, Based on the above observations, the method 400 applies different filtering and matching algorithms in different regions. In the text regions, a high-pass filter is used to remove or reduce background variation. Registration error is alleviated by shifting the relative positions between the templates and the testing bitmaps during matching. For the surrounding regions, low-pass filtering is applied to blur the small text, reduce the noise, and registration sensitivity, and a coarse matching is performed.

In addition to applying different filtering/processing techniques to each region, different weighting factors can be applied to the results as part of the overall matching process. These weights could be tuned according to a number of factors including: training data, expert prior knowledge, or adaptive online optimization. By associating different weights with the matching results from both the text and non-text regions, it is possible to further optimize overall system performance for both accuracy and yield.

As indicated in FIG. 4, method 400 contains two procedures: bitmap generation (processes 401 & 402) and bitmap matching (processes 403 & 404). These bitmap generation processes and bit matching processes will now be described in more detail.

Figure 8:
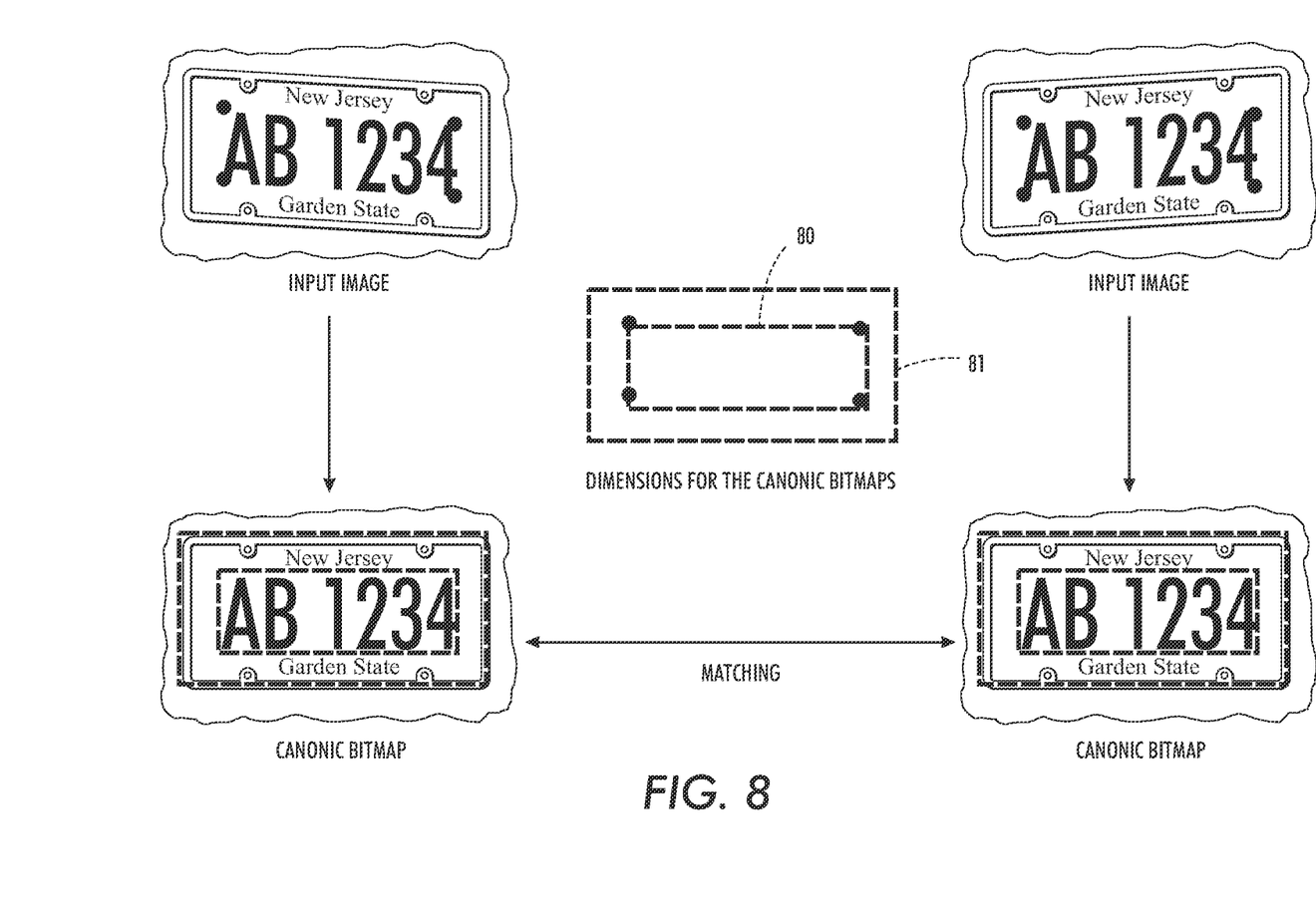
FIG. 8 illustrates examples of various images of the same vehicle license plate captured from different locations and/or with different camera settings.

Plate images can be captured from different locations with different camera settings, and even for the same camera setting there are variations in relative camera plate positions. It is therefore convenient that the template and testing images are normalized into a "canonic" form where the actual resolution, scale, and view angles differences are normalized. A front view of the plate seems to be a natural choice for the canonic bitmap. A set of two rectangles 80, 81 are selected for specifying the dimensions of the canonic bitmaps. This is shown in FIG. 8 (the two rectangles at the center). The smaller inner rectangle defines the text region while the larger outer one defines the entire bitmap. They are shown in FIG. 8 as boxes 80 and 81 in dashed lines, respectively. In the proposed method, the four corners (the dots in FIG. 8) of the text region are also used for geometric registration.

There are several possible strategies in determining the rectangle dimensions: 1) plate specific: each template has its own dimension; 2) plate layout specific: all templates with the same plate layout share the same dimensions. For example, the exemplary plates depicted in FIGS. 7A and 7B share the same dimension, but the plate in FIG. 7C may have a different one. (In FIGS. 7A-7C, the boundary of the text regions is marked by the dashed lines). 3) Global: all templates share the same dimensions. The last strategy is the simplest one, but it could be awkward in handling plates of different layouts. The first strategy has the most flexibility, but often needs more computation. The second one seems to achieve the best balance in performance and computation cost and is explained more in detail in the following discussion. The canonic dimensions for each plate layout type is pre-determined and stored in a database.

Bitmap generation contains two steps: bitmap extraction and filtering. An example of the extraction process 401 and segmentation process 402 of method 400 will now be described in more detail with reference to method 500 of FIG. 5. In bitmap extraction, four corners that define the text region of the input image are first identified (501). The plate layout can also be identified from the input mage (502). The information, together with the layout type (we assume the layout dimension is plate layout specific), can often be obtained from the ALPR. A template having corresponding text and outer regions is associated with the identified plate layout (503). In this particular example, the canonic dimension associated with the identified plate layout is retrieved from the database. A mapping is then calculated between the two sets of four corners: the one specifying the text region in the input image and the one specifying the text region in the canonic form (the inner rectangle) (504). The data in the input image that correspond to the canonic outer rectangle is then extracted (506) along with the canonic inner rectangle containing the text region (507). Interpolation is applied when mapping results are not on a pixel grid.

Figure 5:
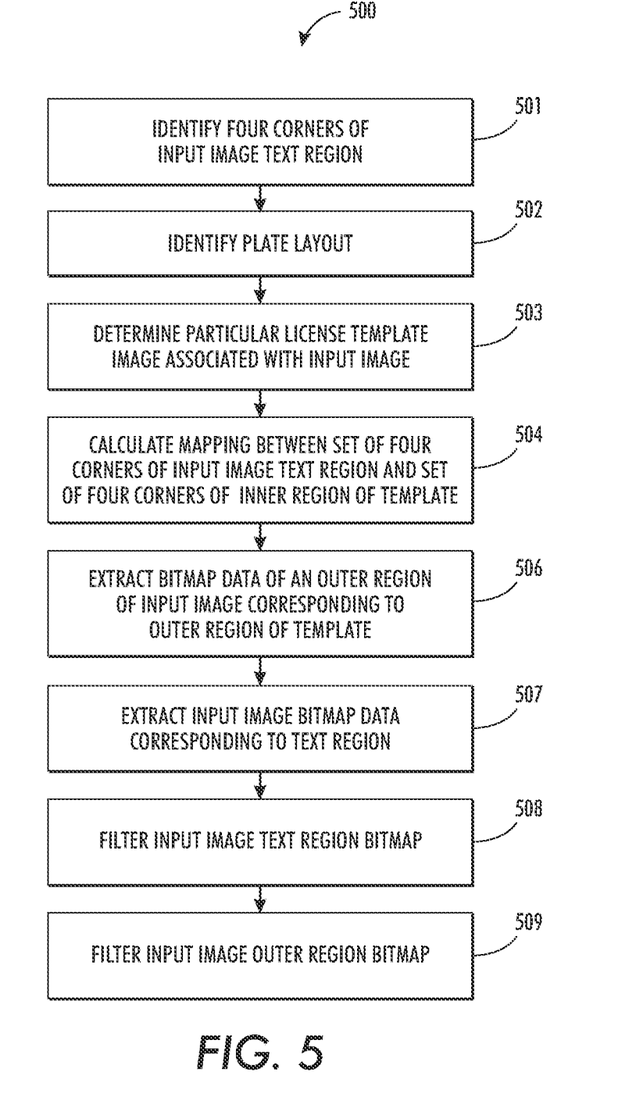
FIG. 5 illustrates a flow chart detailing one example of the processes in FIG. 4 of extracting input plate image bitmap data and segmenting the bitmap data into text region bitmap data and outer region bitmap data according to one embodiment.

The resulting bitmap contains two regions: the data inside the inner rectangle are from the text region and the data outside are from the outer region. The bitmap is then filtered in a region-optimized fashion. The text region is filtered (508). In this particular example, the text region is filtered with a high-pass filter with a very low cutoff frequency to remove variations in illumination and to reduce shadowing effects. The surrounding region is filtered (509). In this particular example, the surrounding region is filtered with a low-pass filter to blur the small details and to reduce registration sensitivity.

Figure 6:
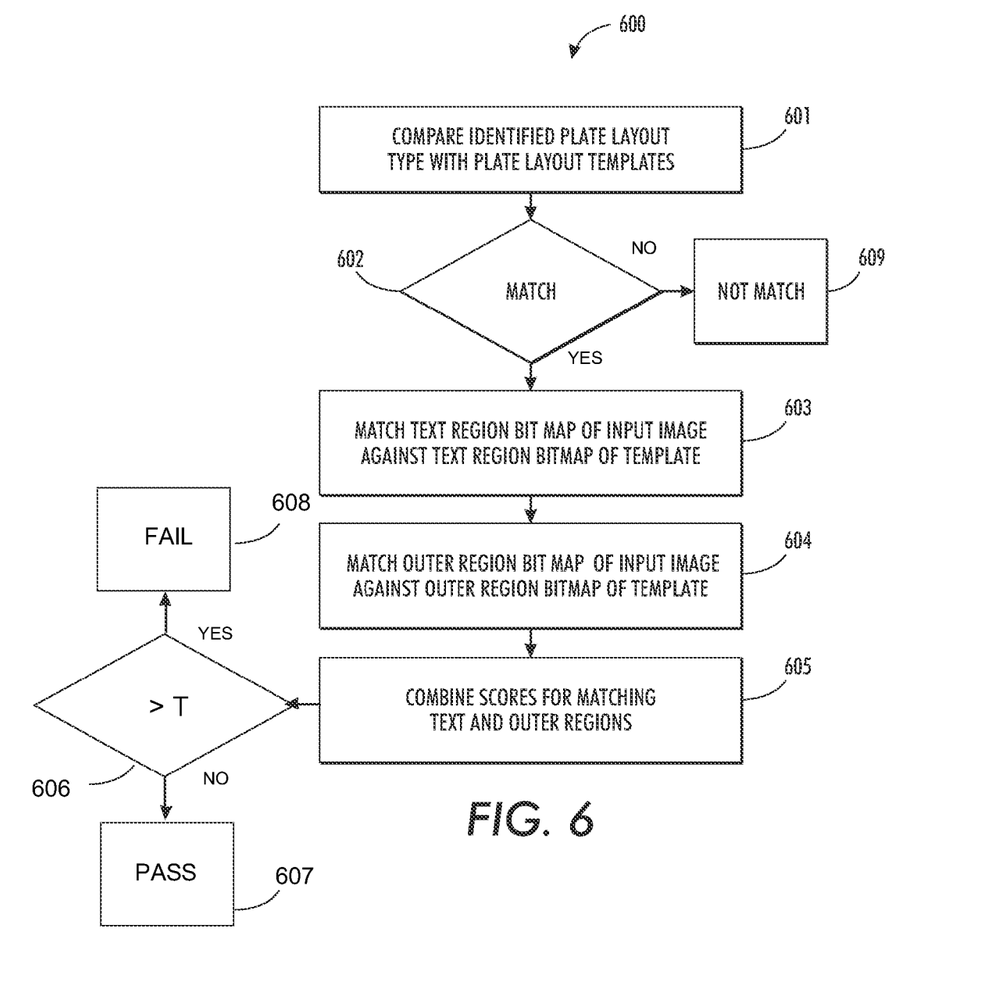
FIG. 6 illustrates a flow chart detailing one example of the processes in FIG. 4 of matching the text region bitmap of the input image and matching the outer region bitmap of the input image against template information according to one embodiment.

An example of the matching processes 403 & 404 of method 400 according to one embodiment will now be described with reference to method 600 of FIG. 6.

In method 600, the layout types of the template and the testing plate are first compared (601). If they are not the same, no further calculation is needed and the matching fails (602, 609). Otherwise, the bitmaps are compared in a region optimized manner. Specifically, the text regions and surrounding regions are compared separately with different algorithms. The filtered text region bit map of the input image is matched against the text region bitmap of the template (603). The filtered surrounding region bitmap of the outer region is matched against the outer region bitmap of the template (604). The matching score for process 603 and process 604 are then combined (605), If the combined matching score is greater than a matching threshold, the matching fails (606, 608). If however, the combined matching score is less than the matching threshold, the matching passes (606,607).

As the text regions are binary in nature and are sensitive to registration inaccuracy, in one example of method 600, matching can be achieved by dividing the text region bit maps into blocks and matching them block by block. For each block, different relative shifts are applied and the one with the best match result is selected. Other known technologies designed for text image matching can also be applied here. This includes performing morphologic dilation in one of the bitmaps, using Hausdorff distances, etc. The surrounding regions are low-pass (particularly after low-pass filtering). The matching can be performed in low resolution to reduce computation. In the following experiments, the matching is implemented as a 2-D correlation operation.

In conclusion, a key challenge for plate verification is the requirements of high matching accuracy and high yield (low reject rate). The apparatus and methods of illustrative embodiments provide plate verification based on region optimized processing. Instead of signatures, plate bitmaps are extracted and matched between templates and testing images. To ensure high accuracy, each bitmap is segmented into two regions: a text region and a surrounding region. Different filtering and matching algorithms are applied that are optimized for each region. In addition, different weights can be associated with each region based on prior knowledge, training data, adaptive learning procedures, etc.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:
1. A method for verifying automatic license plate recognition results, the method comprising:
receiving, in a processing system, an input image of a license plate;
determining, in said processing system, a particular license template image associated with said license plate input image by identifying four corners of a text region of said license plate input image, identifying a plate layout based on said identified four corners, and determining said particular license plate template image based on said plate layout;
extracting, in said processing system, bitmap data from said provided input image;
segmenting, in said processing system, said bitmap data into text region bitmap data and outer region bitmap data;
matching, in said processing system, said text region bitmap data against a text region bitmap of said license plate image template; and
matching, in said processing system, said outer region bitmap data against outer region bitmap of said template.

2. The method of claim 1, further comprising normalizing said license plate input image and said license plate template image into a canonic form.

3. The method of claim 2, wherein extracting bitmap data from said provided input image comprises:
   calculating mapping between the four corners identified from said text region of said input image and four corners of text region of said template;
   extracting, from said input image, bitmap data for an outer region corresponding to the outer region of said license plate template image; and
   extracting, from said input image, bitmap data for the text region corresponding to the inner region of said license plate template image.

4. The method of claim 3, wherein extracting said bitmap data further comprises:
   filtering said outer region bitmap data; and
   filtering said text region bitmap data.

5. The method of claim 4, wherein filtering said outer region bitmap data comprises:
   utilizing a filter specifically configured to filter said outer region; and
   wherein filtering said text region bitmap data comprises utilizing another filter specifically configured to filter said text region.

6. The method of claim 4, the method further comprising:
   determining a score for matching said text region bitmap data against said template bitmap text region;
   determining another score for matching said outer region bitmap data against said template bitmap outer region; and
   determining said license plate input image matches said license plate template image match based on said matching scores.

7. The method of claim 6, the method further comprising:
   applying a weighting to said text region matching score; and
   applying another weighting to said outer region matching score; and wherein determining said license plate input image matches said license plate template image comprises determining said license plate input image matches said license plate template image based on said weighted text region matching score and said weighted outer region matching score.

8. The method of claim 1, further comprising:
   matching of said plate layout of said license plate image input and said plate layout of said license plate template image; and
   determining, based on said matching of said plate layouts, said license plate input image matches said license plate template image match.

9. The method of claim 1, wherein extracting bitmap data from said provided input image comprises:
   calculating mapping between text region of said input image and text region of said template;
   extracting, from said input image, bitmap data for an outer region corresponding to the outer region of said license plate template image; and
   extracting, from said input image, bitmap data for the text region corresponding to the inner region of said license plate template image.

10. A system for verifying automatic license plate recognition results, said system comprising:
    a processor;
    a data bus coupled to said processor; and
    a computer usable medium embodying computer program code, said computer usable medium being coupled to said data bus; and said computer program code comprising instructions executable by said processor and configured to:
    receive an input image of a license plate;
    determine a particular license template image associated with said license plate input image by identifying four corners of a text region of said license plate input image, identifying a plate layout based on said identified four corners, and determining said particular license plate template image based on said plate layout;
    extract bitmap data from said provided input image;
    segment said bitmap data into bitmap data text region and bitmap data outer region;
    match said text region bitmap data against a bitmap text region of said license plate image template; and
    match said outer region bitmap data against a bitmap outer region of said template.

11. The system of claim 10, wherein said computer program code further comprises instructions executable by said processor and configured to:
    normalize said license plate input image and said license plate template image into a canonic form.

12. The system of claim 11, wherein said computer program code further comprises instructions executable by said processor and configured to:
    calculate mapping between the four corners identified from said text region of said input image and four corners of text region of said template;
    extract, from said input image, bitmap data for an outer region corresponding to the outer region of said license plate template image; and
    extract, from said input image, bitmap data for the text region corresponding to the inner region of said license plate template image.

13. The system of claim 12, wherein said computer program code further comprises instructions executable by said processor and configured to:
    filter said outer region bitmap data; and
    filter said text region bitmap data.

14. The system of claim 13, wherein said computer program code further comprises instructions executable by said processor and configured to:
    determine a score for matching said text region bitmap data against said template bitmap text region;
    determine a score for matching said outer region bitmap data against said template bitmap outer region; and
    determine said license plate input image matches said license plate template image based on said matching scores.

15. The system of claim 14, wherein said computer program code further comprises instructions executable by said processor and configured to:
    match said plate layout of said license plate image input and said plate layout of said license plate template image; and
    determine, based on said matching of said plate layouts, said license plate input image matches said license plate template image.

16. A computer-usable medium for verifying automatic license plate recognition results, said computer-usable medium embodying computer program code, said computer program code comprising computer executable instructions configured for:
    receiving an input image of a license plate to a processing system;
    determining a particular license template image associated with said license plate input image by identifying four corners of a text region of said license plate input image, identifying a plate layout based on said identified four corners, and determining said particular license plate template image based on said plate layout;

extracting bitmap data from said provided input image;

segmenting said bitmap data into bitmap text region and bitmap data outer region;

matching said text region bitmap data against a bitmap text region of said license plate image template; and matching outer region bitmap data against a bitmap outer region of said template.

17. The computer-usable medium of claim 16, wherein said computer program code comprising computer executable instructions are further configured for:

normalizing said license plate input image and said license plate template image into a canonic form;

calculating mapping between the four corners identified from said text region of said input image and four corners of text region of said template;

extracting, from said input image, bitmap data for an outer region corresponding to the outer region of said license plate template image; and extracting, from said input image, bitmap data for the text region corresponding to the inner region of said license plate template image.

* * * * *